US005228661A

United States Patent [19]
Bigham et al.

[11] Patent Number: 5,228,661
[45] Date of Patent: Jul. 20, 1993

[54] SPARE TIRE CARRIER AND WINCH

[75] Inventors: Richard Bigham, Eaton Rapids; Cami Shadley, Jackson, both of Mich.

[73] Assignee: ITT Corporation, New York, N.Y.

[21] Appl. No.: 639,488

[22] Filed: Jan. 9, 1991

[51] Int. Cl.⁵ ............................................. B66D 5/06
[52] U.S. Cl. ................................ 254/276; 188/77 W; 188/82.2; 254/323; 254/356; 254/375; 254/903
[58] Field of Search .............. 254/323, 276, 375, 356, 254/903; 464/77; 188/82.6, 82.2, 77 W

[56] References Cited

U.S. PATENT DOCUMENTS

| 702,275 | 6/1902 | Arnold | 254/276 |
|---|---|---|---|
| 808,273 | 12/1905 | Darlington | 254/276 |
| 903,819 | 11/1908 | Holcomb | 254/276 |
| 3,011,605 | 12/1961 | Hungerford | 192/41 S |
| 3,429,521 | 2/1969 | Jones | 192/41 S |
| 3,447,643 | 6/1969 | Ulbing | 188/82.2 |
| 3,726,371 | 4/1973 | Versoy | 192/41 S |
| 3,874,536 | 4/1975 | Watanabe | 254/323 |
| 3,977,652 | 8/1976 | Mauch | 254/375 |
| 4,059,197 | 11/1977 | Iida | 254/323 |
| 4,544,136 | 10/1985 | Denman et al. | 254/323 |
| 4,693,453 | 9/1987 | Ivan | 254/323 |
| 4,705,318 | 11/1987 | Yamada et al. | 188/77 W |
| 4,915,358 | 4/1990 | Stallings | 254/323 |
| 4,969,630 | 11/1990 | Denman | 254/323 |
| 5,060,912 | 10/1991 | Guarr | 254/323 |

FOREIGN PATENT DOCUMENTS 2816681  10/1979  Fed. Rep. of Germany ... 188/77 W

Primary Examiner—Katherine Matecki
Attorney, Agent, or Firm—Robert P. Seiter; J. Gordon Lewis

[57] ABSTRACT

A spare tire lift-and-carry apparatus for use on a vehicle includes a rotatable input shaft supported by a housing. A transmission mechanism is provided for transferring torque from the rotatable input shaft to a cable storage member driven in rotation about a longitudinal axis to retract and deploy a cable having a rim retainer connected at one end. The rim retainer is adapted to engage a spare tire or wheel assembly. A clutch mechanism can be provided for allowing transfer of rotation in both rotational directions from the input shaft to the cable storage mechanism, while preventing transfer of rotation through the clutch mechanism in either rotational direction originating from the cable storage mechanism, rather than the input shaft. A torque override mechanism can also be provided between the input shaft and the transmission mechanism. A stop mechanism can also be provided to prevent further rotation of the cable storage mechanism after the cable is fully deployed, or after the cable has been fully retracted 23 Claims, 4 Drawing Sheets

SPARE TIRE CARRIER AND WINCH

FIELD OF THE INVENTION

The present invention relates to spare tire carriers and winches, sometimes referred to as tire lift-and-carry devices, which typically feature a cable-type winch or the like.

BACKGROUND OF THE INVENTION

The present invention provides significant advantages in the structure and function of the spare tire carrier and winch, and renders the apparatus more efficient and satisfactory in its use, more economical to fabricate, and more versatile in its application. The present invention also provides a longer life for the apparatus and a reduction in the amount of maintenance and replacement required for its operative parts.

The storage of a spare wheel in a vehicle has always been a problem. Designers have found it exceedingly difficult to mount the spare wheel so as to make it accessible and easy to retrieve and replace. Previous devices have proven to be relatively costly to fabricate and a burden on the manipulator, since the devices tend to be heavy in weight, cumbersome in use and less than satisfactory in operation. The construction of the previous devices has oftentimes caused problems that lead to jamming of parts or weakening of supports due to inadvertent misoperation by untrained personnel. By contrast, the present invention can be simply operated by the most inexperienced of persons, and without serious danger to the manipulator and negligible chance of damage to the equipment involved.

The invention resolves various problems heretofore existing in the art with respect to the application of such devices where the load to be lifted, lowered and/or carried thereby is other than essentially directly below and in line with the drum of the winch thereof. At the same time, the invention provides elements for the improved guidance and control of the lift cable which smooths the operation thereof, as well as avoids what has heretofore been a source of early fatigue in the practice of previous devices. The present invention also provides a new and improved overload clutch in the drive system, such that the release of the clutch is more controlled and less abrupt than has been the case during the use of previous devices of this nature.

SUMMARY OF THE INVENTION

The present invention provides a spare tire carrier winch which can be used for the storage and retrieval of the spare tire of a truck, automobile or other vehicle. The construction of this apparatus is such so as to require a minimal amount of space and to facilitate its easy installation and manipulation by persons having little mechanical skill or knowledge. The spare wheel storage and retrieval apparatus of the present invention includes input shaft means having an axis of rotation, transmission means disposed on said input shaft means for rotation about said axis and for transmitting torque from said input shaft means, and cable storage means driven by the transmission means for rotation about a longitudinal axis. The cable storage means generally includes a reel assembly comprising a rotatable spool mounted for rotation in either of opposite directions to which is connected a single line, one end of which is held captive to the spool and the other end of which is adapted to releasably connect to a load which places a tension on the line in use. Override means can also be provided for preventing transmission of overload torque. Clutch means can also be provided for allowing transmission of rotation in both rotational directions from the transmission means through the clutch means, while preventing transmission of torque through the clutch means to the transmission means and input shaft means. The torque transmission and override means, in the preferred embodiment of this invention, includes a torque cup connected to the input shaft means for rotation with the input shaft means. A torque override spring means is engaged within the torque cup for transferring rotational motion from the input shaft means and torque cup, while preventing torque overload by allowing the spring means to slide within the torque cup when subjected to a torque overload. A first rotatable member, or cam and rivet assembly is disposed for rotation about the input shaft means. The rivet portion of the assembly is engageable with the torque override spring means for transferring motion to the cam and rivet assembly. A clutch cup with spring and retainer is disposed about the rotatable cam portion of the cam and rivet assembly for transferring rotation along a transmission path originating at the input shaft means, while preventing transference of motion along the transmission path originating at the cable storage means. A second rotatable member or pinion gear means is disposed for rotation about the input shaft means. The pinion gear means is driven in response to rotation of the cam and rivet assembly, and prevented from driving the cam and rivet assembly by the spring and clutch cup assembly. Cluster gear means may be engaged with and driven by the pinion gear means. A spur gear may be connected to the cable storage means for engagement with the cluster gear means, such that the cable storage means is driven by the cluster gear means. The cable storage means can include a cable spool disposed for rotation about a stationary pin. The cable spool in one embodiment preferably has a helical cable receiving groove disposed on an external surface thereof for engaging and storing a cable therein, and a threaded surface means disposed facing the stationary shaft along a portion of its longitudinal length. In the preferred embodiment of the present invention, stop means may be engaged for sliding movement longitudinally along the stationary shaft in response to rotation of the cable spool. The stop means is disposed in engagement with the threaded surface means and the shaft, such that the stop means engages in abutment with the cable spool or the housing when the cable is fully deployed or fully retracted.

Other objects, advantages and applications of the present invention will become apparent to those skilled in the art of tire lift-and-carry devices when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
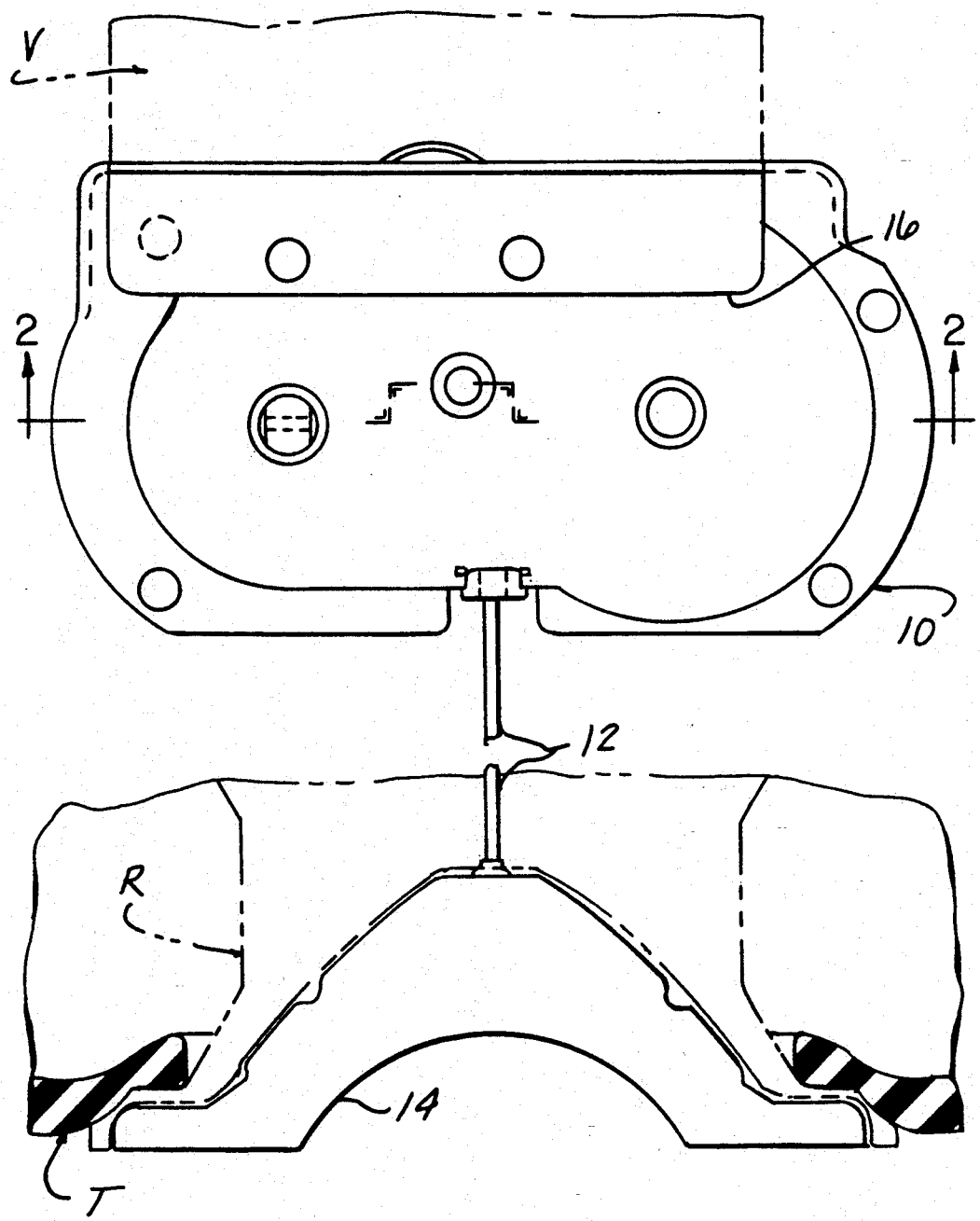
FIG. 1 is a side elevational view of the spare tire carrier and winch according to the present invention.

The present invention, as shown in FIG. 1 of the drawings, includes housing means 10 having cable means 12 extending therefrom. The cable means 12 is attached to a rim retainer means 14. The rim retainer means 14 is engageable with a rim R and tire T assembly comprising the spare wheel intended for storage beneath the vehicle. Mounting bracket means 16 is provided on the housing means 10 for attachment to a vehicle body portion V.

Figure 2:
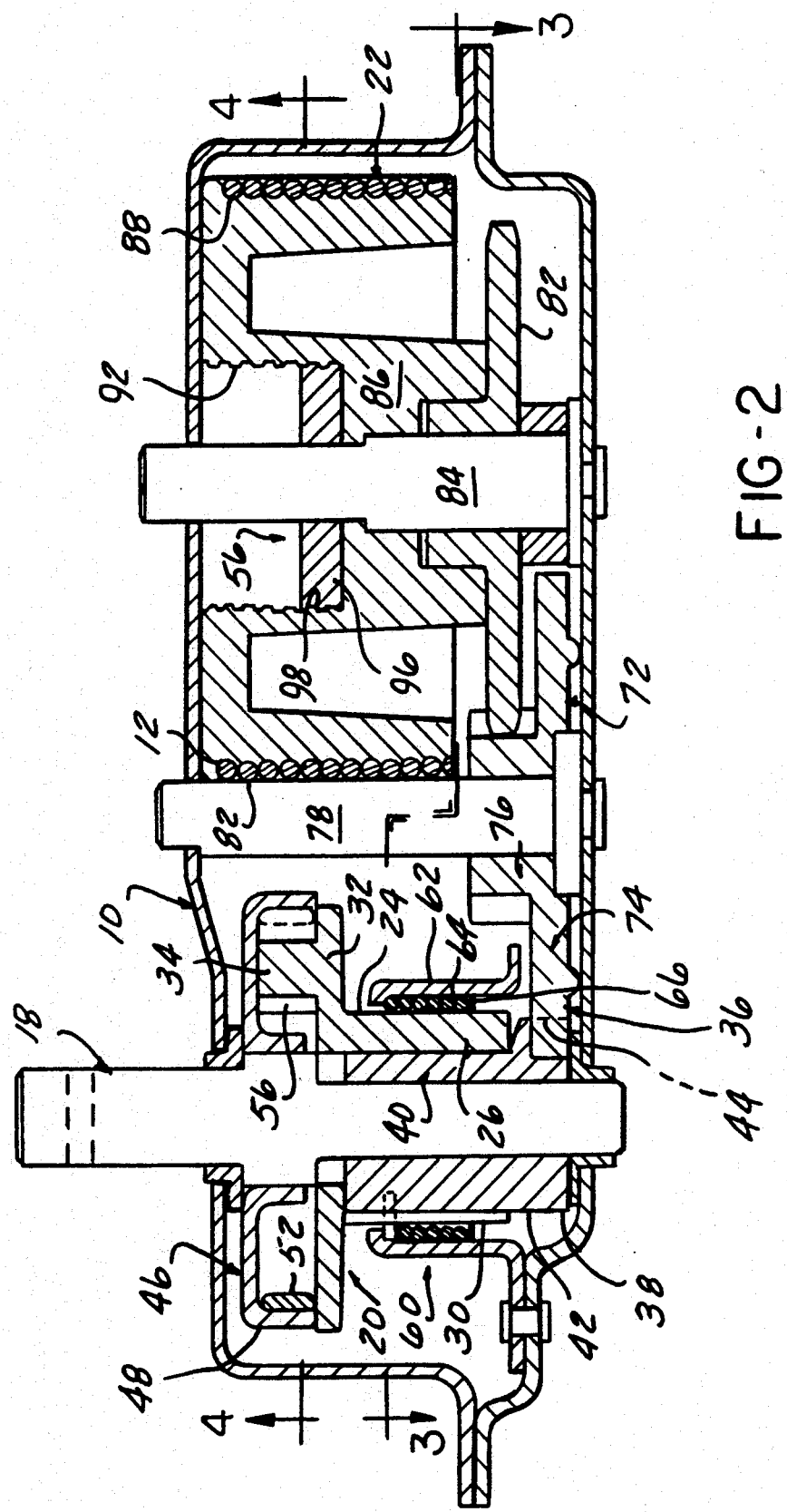
FIG. 2 is a cross sectional view of the spare tire carrier and winch taken as shown in FIG. 1.

As best seen in FIG. 2 of the drawings, the present invention includes input shaft means 18 disposed for rotation within said housing means 10 and having an external shaft portion adapted for engagement with drive means (not shown) of either the manual or automatic powered type. The housing means 10 supports the input shaft means 18 for rotation about an axis of rotation. Torque transmission means 20 is connected to the input shaft means 18 for transmitting torque and subsequent rotation from the input shaft means 18 to a cable storage means 22. The cable storage means 22 is driven by the transmission means 20 for rotation about a longitudinal axis.

The transmission means 20 can include a first rotatable member 24 having a cylindrical portion 26 with a longitudinally extending slot formed in the cylindrical portion 26 defining generally opposing first and second side wall faces 28 and 30, respectively. The first rotatable member 24 also includes an annular radially extending flange-like portion 32 generally disposed at one end of the cylindrical portion 26. The annular portion 32 includes a longitudinally extending projection 34 spaced radially from the longitudinal axis of the cylindrical portion 26. The projection 34 is adapted to engage a portion of the input shaft means 18 for rotation therewith. Rotation means 36 is driven by the first rotatable member 24 to impart rotation to the cable storage means 22. The means 36 can include second rotatable member 38 having an elongated cylindrical portion 40 adapted to be received on a portion of the input shaft means 18 for rotation independent of said input shaft means 18. The elongated cylindrical portion 40 of the second rotatable member 38 is also adapted to be at least partially received within the cylindrical portion 26 of the first rotatable member 24. A radially extending projection 42 extends from the elongated cylindrical portion 40 of the second rotatable member 38 into the slot formed between the first and second side wall faces 28 and 30, respectively, formed in the cylindrical portion 26 of the first rotatable member 24. The radially extending projection 42 may also extend longitudinally along the elongated cylindrical portion 40 of the second rotatable member 38. In the preferred embodiment of the present invention depicted in FIGS. 2 and 3, the second rotatable member 38 includes a pinion gear portion 44 disposed at one end of the elongated cylindrical portion 40 with the radially extending projection 42 formed by one longitudinally extending gear tooth along the entire longitudinal length of the elongated cylindrical portion 40.

Figure 4:
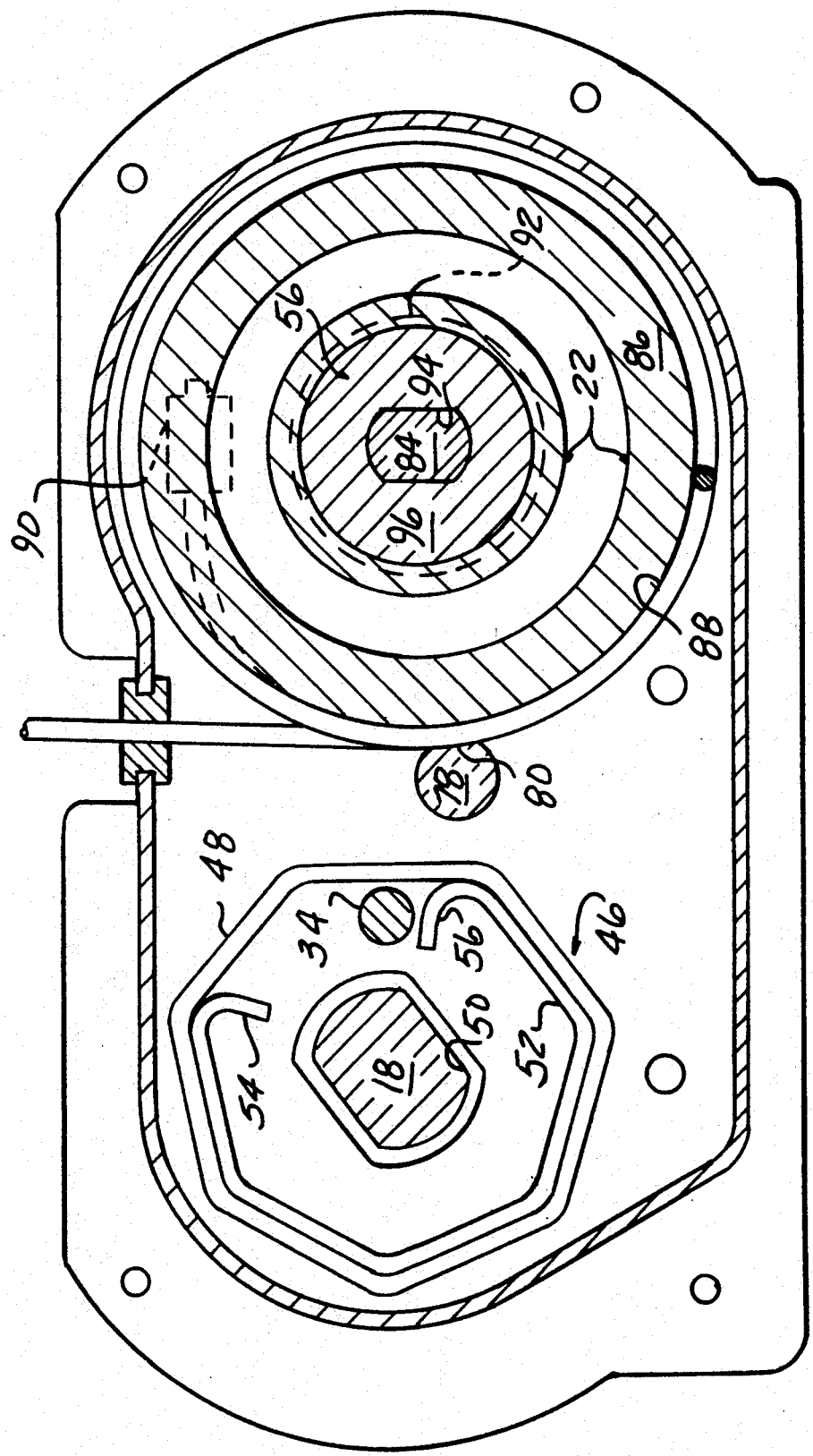
FIG. 4 is a cross sectional view of the spare tire carrier and winch taken as shown in FIG. 2.

Referring now to FIGS. 2 and 4, in the preferred embodiment of the present invention, the transmission means 20 includes torque override means 46. Torque override means 46 can include a torque cup 48 connected to the input shaft means 18 for rotation therewith. This may be accomplished by mounting the torque cup 48 on a portion of the input shaft means 18 which includes at least one input shaft flat 50. Of course, it should be recognized that other means of connecting the torque cup 48 to the input shaft means 18 for rotation therewith is to be considered within the scope of the present invention. For example, the torque cup 48 may be permanently mounted or connected to the input shaft means 18 by means of welding or other permanent attachment means, or may be mounted in a non-permanent manner, such as by a key way, pin, set screw or the like, in addition to the mounting manner depicted in the attached drawings. A torque override spring 52 is disposed within the torque cup 48. In the preferred embodiment, the outer wall of the torque cup 48 has a polygonal shape with the torque override spring 52 having a complementary shape. The torque override spring 52 includes tab portions 54 and 56, respectively, at opposing ends thereof which are bent to project radially inwardly from the outer wall of the torque cup 48. These tab portions 54 and 56 engage the longitudinally extending projection 34 of the first rotatable member 24 as the input shaft means 18 is rotated about its rotational axis. When a torque overload condition exists in either rotational direction, the frictional binding force of the torque override spring 52 against the side wall of the torque cup 48 and its polygonal configuration will be overcome causing the torque cup and spring to rotate with respect to one another an angular distance generally at least equal to one side of the polygonal shape to a point at which the torque override spring 52 will, by virtue of its resilient nature, be forced back into a complementary configuration with respect to the outer wall of the torque cup 48. Of course, other structural configurations may be substituted for the torque override means 46 disclosed and described herein. The torque override means 46 of the present invention is disposed between the input shaft means 18 and the transmission means 20 to prevent transmission of overload torque from the input shaft means 18 through the transmission means 20 to the cable storage means 22.

Figure 3:
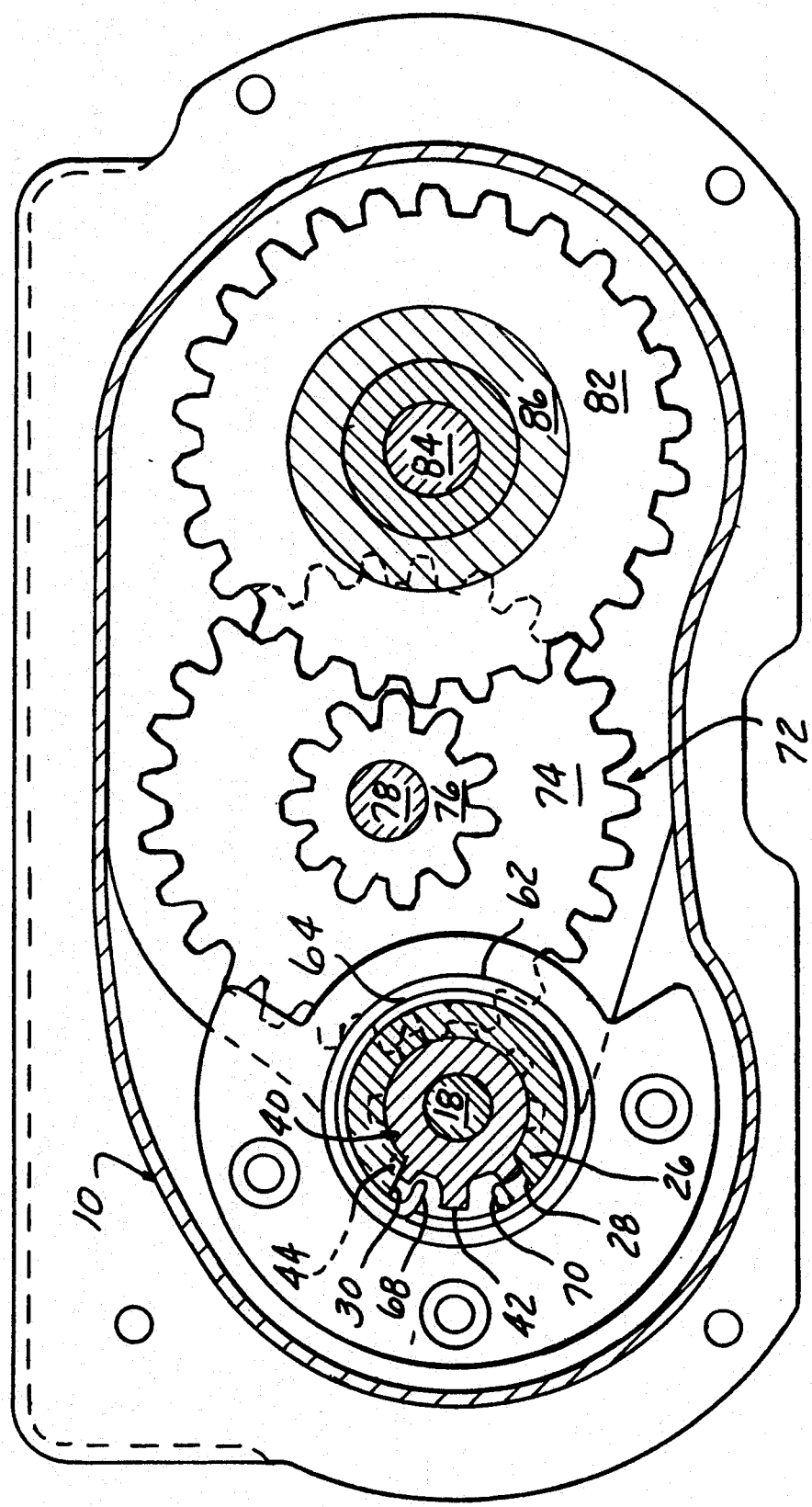
FIG. 3 is a cross sectional view of the spare tire carrier and winch taken as shown in FIG. 2.

Referring again to FIGS. 2 and 3, the preferred embodiment of the present invention also includes clutch means 60 for allowing the transmission of rotation in either direction when passing from the input shaft means 18 to the cable storage means 22, while preventing the transmission of rotation in either direction when passing from the cable storage means 22 to the input shaft means 18. The clutch means 60 can include a clutch cup 62 connected to the housing means 10. The clutch cup 62 generally sheathes at least a part of the cylindrical portion 26 of the first rotatable member 24. A helical clutch spring 64 is disposed within the clutch cup 62 generally interposed between the clutch cup 62 and the cylindrical portion 26 of the first rotatable member 24. The helical clutch spring 64 is held within clutch cup 62 by retainer means 66. The retainer means 66 can include a radially inwardly extending lip disposed on one end of the clutch cup 62 and a retainer clip connected to the clutch cup at an opposite longitudinal end from the radially inwardly extending lip of the clutch cup 62. As best seen in FIGS. 2 and 3, the helical clutch spring 64 includes first and second radially inwardly extending end portions 68 and 70, respectively, disposed within the radially extending projection 42 of the second rotatable member 38 and opposed between the first and second radially inwardly extending end portions 68 and 70, respectively. Each end portion, 68 and 70, respectively, is interposed between the radially extending projection 42 and one of the first and second side wall faces 28 and 30, respectively, defining the slot formed in the cylindrical portion 26 of the first rotatable member 24. In this manner, when the first rotatable member 24 begins to turn in response to rotation of the input shaft means 18, one of the first and second side wall faces 28 or 30, respectively, first engages one of the corresponding end portions 68 or 70, respectively, depending on the direction of rotation, before engaging and transferring rotational motion and torque to the second rotatable member 38 through the radially extending projection 42. Contact between the first rotatable member 24 and one of the end portions 68 or 70 of the helical clutch spring 64, causes the helical clutch spring to be drawn more tightly around the outer diameter of the cylindrical portion of the first rotatable member 24 and away from the inner side wall of the clutch cup 62, thereby allowing free transfer of the rotation and torque without any braking action when the first rotatable member 24 is driven in either rotational direction. On the other hand, if rotational movement and torque is being carried in the opposite transmission direction or path, with rotation initiating through the second rotatable member 38, the second rotatable member 38 will first engage one of the end portions 68 or 70 of the helical clutch spring 64, depending on the direction of rotation, causing the spring 64 to be driven in an unwinding direction which expands the spring away from the outer diameter of the cylindrical portion 26 of the first rotatable member 24 and into contact with the inner surface of the clutch cup 62, thereby imparting a braking action to the second rotatable member 38 and the first rotatable member 24 to prevent rotation in either direction from being transferred from the cable storage means 22 to the input shaft means 18.

The means 36 is driven by the second rotatable member 38 to cause the cable storage means 22 to rotate in either rotational direction to thereby spool or unspool cable from the cable storage means 22. Of course, the second rotatable member 38 and means 36 may be replaced by other known drive means without departing from the spirit and scope of the present invention. For example, the gears disclosed and depicted in the attached figures could be replaced with a chain and sprocket means, belt-driven means, friction roller means or the like. However, the preferred embodiment of the present invention is as depicted in the attached drawings having a direct drive gear means for transferring rotational motion from the second rotatable member 38 to the cable storage means 22. As can best be seen in FIGS. 2 and 3, the gear means 36 preferably includes a cluster gear 72 having first and second gears 74 and 76, respectively, with common axes of rotation; preferably, the first gear 74 having a larger diameter than the second gear 76.

The cluster gear 72 is mounted for rotation on a stationary shaft or pin 78. The stationary shaft or pin 78 has a generally flat face portion 80, best seen in FIGS. 2 and 4, disposed so as to act as a cable retainer to maintain the cable in position on the cable storage means 22. The first larger gear 74 of the cluster gear 72 is disposed in engagement with the pinion gear portion 44 of the second rotatable member 38. A spur gear 82 is disposed in engagement with the second smaller gear 76 of the cluster gear 72. The spur gear 82 is connected to the cable storage means 22 for imparting rotation thereto.

In the preferred embodiment, as best seen in FIG. 2, the spur gear 82 and cable storage means 22 have common axes of rotation and are supported on a second stationary shaft or pin 84.

The cable storage means 22 preferably includes a cable spool 86 having a helical cable groove 88 formed on an outer peripheral surface thereof. Cable anchoring means 90 is provided at one terminal end of the helical cable groove 88 for connecting the cable 12 to the cable spool 86. In its preferred form, the cable storage means 22 also includes stop means 56 for preventing further rotation of the cable spool 86 beyond a point of full cable deployment, or beyond a point of full cable retraction. Of course, the cable storage means may take other forms different from that described above. For example, the cable storage means 22 can include a cable spool having generally rigid opposing end plates spaced from one another a distance generally equal to the diameter of the cable plus a small allowance for clearance, such that the cable is wound upon itself as it is retracted and stored on the cable spool.

The stop means 56 can include a threaded portion 92 of the cable spool 86 disposed facing a portion of the second stationary shaft or pin 84 having at least one flat surface 94. A stop member or disk 96 is engaged on the second stationary shaft 84 along the portion having the flat surface 94 for reciprocal or sliding movement along the longitudinal axis of the shaft 84 between first and second end limits of travel. The stop member or disk 96 includes a complementary threaded portion 98 engageable with the threaded portion 92 of the cable spool 86. In response to rotation in either direction of the cable spool 86, the stop member 96 is driven along the longitudinal axis by the interaction of the interconnecting threaded portions 92 and 98, until reaching one of the end limits of movement. After reaching one of the end limits of movement, the stop member or disk 96 is prevented from further longitudinal movement in the longitudinal direction corresponding to the particular direction of rotation of the cable spool 86, and prevents further rotation of the cable spool 86 in that particular direction. The rotation of the cable spool 86 can then be reversed which drives the stop member or disk 96 in the opposite longitudinal direction to the other end limit of movement, where further rotation of the cable spool 86 in that direction is prevented by the stop member or disk 96. The complementary flat surfaces 94 of the second stationary shaft 84 and stop member 96 prevent the stop member or disk 96 from rotating with respect to the second stationary shaft 84, while allowing longitudinal movement of the stop member 96 in either direction.

While the invention has been described in connection with what is presently considered to be the most practical and referred embodiment, it is to be understood that the invention is not to be limited to the disclosed embodiment, but, on the contrary, is intended to cover various modifications and equivalent arrangements included within the spirit and scope of the appended claims. Therefore, the foregoing description is to be considered exemplary rather than limiting, and the true scope of the invention is that defined in the following claims.

What is claimed is:

1. A spare tire lift and carry apparatus for use in a vehicle comprising:

input shaft means having an axis of rotation:

transmission means, disposed on said input shaft means, for rotation about said axis of rotation, said transmission means for transmitting rotation and torque from said input shaft means;

cable storage means driven by said transmission means in rotation about a longitudinal axis parallel to and offset from said axis of rotation of said input shaft means;

clutch means for allowing transmittal of rotation in both rotational direction from the input shaft means to the cable storage means, while preventing transmittal of rotation in both rotational directions from said cable storage means to said input shaft means, said clutch means disposed coaxial with said axis of rotation of said input shaft means;

cable means having one end connected to said cable storage means for retraction and deployment in response to rotation of said cable storage means, said cable means helically wound about said cable storage means when stored; and rim retainer means connected to an opposite end of said cable means and adapted for engagement with a spare wheel for lifting and carrying said spare wheel in a stored position.

2. The apparatus of claim 1 further comprising:
housing means enclosing said transmission means and said cable storage means, said housing means supporting said input shaft means for rotation about said axis of rotation.

3. The apparatus of claim 2 further comprising:
mounting bracket means connected to said housing means for supporting said housing means from a vehicle.

4. The apparatus of claim 1 further comprising:
override means for allowing torque and rotation up to a predetermined limit, while preventing torque and rotation beyond said predetermined limit.

5. The apparatus of claim 4 further comprising:
said override means including a torque cup connected to said input shaft means for rotation therewith, said torque cup having a longitudinally extending sidewall, said override means further including a complimentary shaped torque override spring engageable within said torque cup, said spring having radially inwardly extending tabs at each end disposed for engagement with said transmission means, such that said spring is moveable with respect to said longitudinally extending sidewalls in response to an application of torque greater than said predetermined limit.

6. The apparatus of claim 1 further comprising:
stop means engageable with said cable storage means for preventing rotational movement of said cable storage means beyond first and second predetermined positions, corresponding to said cable means being in a fully extended position and a fully retracted position, respectively.

7. The apparatus of claim 1 further comprising:
said cable storage means including a shaft having a longitudinal axis and a portion of said shaft having at least one flat surface, a cable spool disposed for rotation about said longitudinal axis, said spool having a helical groove for receiving and storing said cable means, said spool further having a threaded portion disposed opposing said portion of said shaft having at least one flat surface; and stop means, engageable with said cable spool for preventing rotational movement of said cable spool beyond first and second predetermined positions, corresponding to said cable means being in a fully extended position and a fully retracted position, respectfully, said stop means including a stop member mounted on said portion of said shaft having at least one flat surface, such that said stop member is adapted for longitudinal reciprocation between first and second end limits of movements while being prevented from rotating with respect to said shaft, said stop member further having a complimentary threaded portion engageable with said threaded portion of said cable spool, such that said stop member is driven longitudinally along said shaft in response to rotation of said cable spool in a given direction up to one of said end limits of movement, thereafter said stop member preventing further rotation of said cable spool in said given direction while permitting rotation in an opposite direction.

8. A spare tire lift and carry apparatus for use in a vehicle comprising:
input shaft means having an axis of rotation:
transmission means, disposed on said input shaft means, for rotation about said axis of rotation, said transmission means for transmitting rotation and torque from said input shaft means;

cable storage means driven by said transmission means in rotation about a longitudinal axis parallel to and offset from said axis of rotation of said input shaft means;

cable means having one end connected to said cable storage means for retraction and deployment in response to rotation of said cable storage means, said cable means helically wound about said cable storage means when stored;

rim retainer means connected to an opposite end of said cable means and adapted for engagement with a spare wheel for lifting and carrying said spare wheel in a stored position; and said transmission means including a first rotatable member disposed for rotation about said input shaft means, said first rotatable member having a cylindrical portion with a longitudinally extending slot formed in a sidewall defined by first and second opposing sidewall surfaces, said first rotatable member further having an annular radially extending portion with a longitudinally extending projection spaced radially from said axis of rotation, said projection adapted to drive said first rotatable member in rotation through connection with said input shaft means.

9. The apparatus of claim 8 further comprising:
override means for allowing torque and rotation up to a predetermined limit, while preventing torque and rotation beyond said predetermined limit.

10. The apparatus of claim 9 further comprising:
said override means including a torque cup connected to said input shaft means for rotation therewith, said torque cup having a plurality of longitudinally extending sidewall, said override means further including a torque override spring engageable within said torque cup, said spring having a radially inwardly extending tab at each end disposed for engagement with said transmission means.

11. The apparatus of claim 10 further comprising:
clutch means for allowing transmittal of rotation in both rotational directions from the input shaft means to the cable storage means, while preventing transmittal of rotation in both rotational directions from said cable storage means to said input shaft means.

12. The apparatus of claim 11 further comprising:
said clutch means including a clutch cup fixed against rotation with respect to said input shaft means and said first rotatable member, said clutch cup sheathing at least a part of said cylindrical portion of said first rotatable member, a helical clutch spring interposed between said cylindrical portion and said clutch cup, said helical clutch spring having first and second inwardly extending tabs engageable with said first and second opposing sidewall surfaces respectively, such that rotation of said first rotatable member engages one of said inwardly extending tabs of said helical clutch spring to draw said helical clutch spring into tighter engagement about an outer peripheral surface of said cylindrical portion and away from an inner surface of said clutch cup to allow rotation in both rotation directions initiated through rotation of said first rotatable member.

13. The apparatus of claim 12 further comprising:
said transmission means further including a second rotatable member disposed for rotation about said input shaft means and interposed between said input shaft means and said first rotatable member, said second rotatable member having a radially outwardly extending projection engageable within said slot formed in said cylindrical portion of said first rotatable member, such that said first and second tabs of said helical clutch spring are interposed between said radially outwardly extending projection and said first and second sidewall surfaces of said slot respectively, wherein rotation of said first rotatable member is transferred to said second rotatable member through said radially outwardly extending projection and transference of rotation from said second rotatable member to said first rotatable member is prevented by said helical clutch spring being driven in an unwinding direction into frictional engagement with said inner surface of said clutch cup and away from said outer peripheral surface of said cylindrical portion of said first rotatable member as said radially outwardly extending projection engages one of said first and second tabs, said second rotatable member adapted to drive said cable spool in rotation about said longitudinal axis when driven by said first rotatable member.

14. The apparatus of claim 13 further comprising:
stop means engageable with said cable storage means for preventing rotational movement of said cable storage means beyond first and second predetermined positions, corresponding to said cable means being in a fully extended position and a fully retracted position, respectfully.

15. The apparatus of claim 14 further comprising:
said cable storage means including a shaft having a longitudinal axis and a portion of said shaft having at least one flat surface, a cable spool disposed for rotation about said longitudinal axis, said spool having a helical groove for receiving and storing said cable means, said spool further having a threaded portion disposed opposing said portion of said shaft having at least one flat surface; and
said stop means including a stop member mounted on said portion of said shaft having at least one flat surface, such that said stop member is adapted for longitudinal reciprocation between first and second end limits of movements while being prevented from rotating with respect to said shaft, said stop member further having a complimentary threaded portion engageable with said threaded portion of said cable spool, such that said stop member is driven longitudinally along said shaft in response to rotation of said cable spool in a given direction up to one of said end limits of movement, thereafter said stop member preventing further rotation of said cable spool in said given direction while permitting rotation in an opposite direction.

16. A spare tire lift and carry apparatus comprising:
a vehicle body portion;
input shaft means having an axis of rotation;
cable storage means driven by said input shaft means in rotation about a longitudinal axis parallel to and offset from said axis of rotation of said input shaft means;
clutch means for allowing transmittal of rotation in both rotational directions from the input shaft means to the cable storage means, while preventing transmittal of rotation in both rotational directions from said cable storage means to said input shaft means, said clutch means disposed coaxial with said axis of rotation of said input shaft means;
housing mans enclosing said cable storage means, said housing means supporting said input shaft means for rotation about said axis of rotation;
mounting means for supporting said housing means from said vehicle body portion;
cable means having one end connected to said cable storage means for retraction and deployment in response to rotation of said cable storage means, said cable means helically wound about said cable storage means when stored; and
rim retainer means connected to an opposite end of said cable means and adapted for engagement with a spare wheel for lifting and carrying said spare wheel in a stored position.

17. The apparatus of claim 16 further comprising:
transmission means, disposed on said input shaft mans, for rotation about said axis of rotation, said transmission means for transmitting rotation and torque from said input shaft means.

18. The apparatus of claim 16 further comprising:
override means for allowing torque and rotation up to a predetermined limit, while preventing torque and rotation beyond said predetermined limit.

19. The apparatus of claim 18 further comprising:
said override means including a torque cup connected to said input shaft mans for rotation therewith, said torque cup having a longitudinally extending sidewall, said override means further including a complimentary shaped torque override spring engageable within said torque cup, said spring having radially inwardly extending tabs at each end disposed for connection with said cable storage means, such that said spring is moveable with respect to said longitudinally extending sidewalls in response to an application of torque greater than said predetermined limit.

20. The apparatus of claim 16 further comprising:
stop means engageable with said cable storage means for preventing rotational movement of said cable storage means beyond first and second predetermined positions, corresponding to said cable means being in a fully extended position and a fully retracted position, respectfully.

21. The apparatus of claim 16 further comprising:
said cable storage means including a shaft having a longitudinal axis and a portion of said shaft having at least one flat surface, a cable spool disposed for rotation about said longitudinal axis, said spool having a helical groove for receiving and storing said cable means, said spool further having a threaded portion disposed opposing said portion of said shaft having at least one flat surface; and
stop means, engageable with said cable spool for preventing rotational movement of said cable spool beyond first and second predetermined positions, corresponding to said cable means being in a fully extended position and a fully retracted position, respectfully, said stop means including a stop member mounted on said portion of said shaft having at least one flat surface, such that said stop member is adapted for longitudinal reciprocation between first and second end limits of movements while being prevented from rotating with respect to said shaft, said stop member further having a complimentary threaded portion engageable with said threaded portion of said cable spool, such that said stop member is driven longitudinally along said shaft in response to rotation of said cable spool in a given direction up to one of said end limits of movement, thereafter said stop member preventing further rotation of said cable spool in said given direction while permitting rotation in an opposite direction.

22. A spare tire lift and carry apparatus for use in a vehicle comprising:
input shaft means having an axis of rotation:
transmission means, disposed on said input shaft means, for rotation about said axis of rotation, said transmission means for transmitting rotation and torque from said input shaft means;
cable storage means driven by said transmission means in rotation about a longitudinal axis parallel to and offset from said axis of rotation of said input shaft means;
cable means having one end connected to said cable storage means for retraction and deployment in response to rotation of said cable storage means, said cable means helically wound about said cable storage means when stored;
rim retainer means connected to an opposite end of said cable means and adapted for engagement with a spare wheel for lifting and carrying said spare wheel in a stored position; and
override means for allowing torque and rotation up to a predetermined limit, while preventing torque and rotation beyond said predetermined limit, said override means including a torque cup connected to said input shaft means for rotation therewith, said torque cup having a longitudinally extending sidewall, said override means further including a complimentary shaped torque override spring engageable within said torque cup, said spring having radially inwardly extending tabs at each end disposed for engagement with said transmission means, such that said spring is moveable with respect to said longitudinally extending sidewalls in response to an application of torque greater than said predetermined limit.

23. A spare tire lift and carry apparatus for use in a vehicle comprising:
input shaft means having an axis of rotation:
transmission means, disposed on said input shaft means, for rotation about said axis of rotation, said transmission means for transmitting rotation and torque from said input shaft means;
cable storage means driven by said transmission means in rotation about a longitudinal axis parallel to and offset from said axis of rotation of said input shaft means;
cable means having one end connected to said cable storage means for retraction and deployment in response to rotation of said cable storage means, said cable means helically wound about said cable storage means when stored;
rim retainer means connected to an opposite end of said cable means and adapted for engagement with a spare wheel for lifting and carrying said spare wheel in a stored position;
said cable storage means including a shaft having a longitudinal axis and a portion of said shaft having at least one flat surface, a cable spool disposed for rotation about said longitudinal axis, said spool having a helical groove for receiving and storing said cable means, said spool further having a threaded portion disposed opposing said portion of said shaft having at least one flat surface; and
stop means, engageable with said cable spool for preventing rotational movement of said cable spool beyond first and second predetermined positions, corresponding to said cable means being in a fully extended position and a fully retracted position, respectfully, said stop means including a stop member mounted on said portion of said shaft having at least one flat surface, such that said stop member is adapted for longitudinal reciprocation between first and second end limits of movements while being prevented from rotating with resect to said shaft, said stop member further having a complimentary threaded portion engageable with said threaded portion of said cable spool, such that said stop member is driven longitudinally along said shaft in response to rotation of said cable spool in a given direction up to one of said end limits of movement, thereafter said stop member preventing further rotation of said cable spool in said given direction while permitting rotation in an opposite direction.

* * * * *